United States Patent [19]

Angle et al.

[11] Patent Number: 4,505,327
[45] Date of Patent: Mar. 19, 1985

[54] HEATING AND COOLING APPARATUS HAVING EVAPORATIVE COOLER AND HEAT PUMP

[75] Inventors: Lonnie L. Angle, 2207 E. McDowell Rd., Mesa, Ariz. 85203; John R. Roberts, Jr., Glendale, Ariz.

[73] Assignee: Lonnie L. Angle, Mesa, Ariz.

[21] Appl. No.: 252,402

[22] Filed: Apr. 9, 1981

[51] Int. Cl.³ ............................................ F25B 25/00
[52] U.S. Cl. .................................. 165/48 R; 237/2 B; 62/305; 62/314; 62/304; 62/324.1; 62/332; 165/60
[58] Field of Search ....................... 62/159, 160, 235.1, 62/236, 238.1, 238.6, 324.1, 324.2, 324.3, 324.4, 324.5, 324.6, 259.4, 304, 305, 309, 311, 314, 332, 426, 428, 507, 506, 171; 237/2 B; 165/29, 59, 60, 48, 58

[56] References Cited

U.S. PATENT DOCUMENTS

| | | | |
|---|---|---|---|
| 2,986,904 | 6/1961 | Williamson | 237/2 B X |
| 3,108,451 | 10/1963 | Clifford | 62/184 |
| 3,182,718 | 5/1965 | Goettl | 62/311 |
| 3,252,508 | 5/1966 | Goettl | 165/48 |
| 3,267,995 | 8/1966 | Maudlin | 165/29 |
| 3,427,005 | 2/1969 | Kuykendall | 261/26 |
| 3,859,818 | 1/1975 | Goettl | 62/309 |
| 3,867,979 | 2/1975 | Carrasse et al. | 165/29 |
| 4,066,118 | 1/1978 | Goettl | 62/325 |
| 4,204,409 | 5/1980 | Satama | 62/305 |
| 4,242,872 | 1/1981 | Shaw | 237/2 B |
| 4,254,822 | 3/1981 | Geier | 165/29 |
| 4,351,163 | 9/1982 | Johannsen | 62/305 |

Primary Examiner—Albert W. Davis, Jr.
Attorney, Agent, or Firm—H. Gordon Shields

[57] ABSTRACT

Heating and cooling apparatus includes an evaporative cooler and a heat pump connected to each other and to a common duct system for utilizing the attributes of both systems for efficient heating and cooling. The evaporative cooler may be used to cool a structure directly or it may be used to cool the condenser coils of a heat pump. The evaporative cooler may also be used to cool attic space. The evaporative cooler and the heat pump are disposed adjacent to each other and are connected by an interface adapter, and the interface adapter is in turn connected to attic space through which air from the attic flows, particularly to assist the heat pump in the heating mode.

17 Claims, 7 Drawing Figures

HEATING AND COOLING APPARATUS HAVING EVAPORATIVE COOLER AND HEAT PUMP

BACKGROUND OF THE INVENTION

1. Field of the Invention

This invention relates to heating and cooling systems, and, more particularly, to heating and cooling systems having both evaporative coolers and heat pumps connected to a common duct system, including the use of evaporative cooling as a precooler for a condenser and the use of evaporative cooling for an attic, all from a single system utilizing movable dampers in a duct system.

2. Description of the Prior Art

Evaporative cooling systems are old and well known in the art. They utilize the heat of vaporization for cooling air. Ambient air is simply drawn through water soaked pads. The hot, low humidity outside air is cooled by giving up heat to evaporate the water on the pads. The cooled air has its humidity increased in the process. Such systems have their drawbacks in that there must be a continuous supply of fresh, warm (hot), and relatively dry (low humidity) air. Moreover, the building in which the system is used must be able to handle the supply of incoming air, and that requires some type of ducting of the air out of the structure, to be returned to the outside air.

Another disadvantage of evaporative cooling systems is the substantial increase in the humidity within the structure during the time of operation of the evaporative cooling system. Along with this disadvantage, it is obvious that if the air supplied to the evaporative cooling system has a high relative humidity, the functioning of the system is decreased. In other words, as the relative humidity of the ambient air increases, the efficiency of the cooling system decreases.

Heat pumps are also well known and understood in the art. A heat pump is a system with a reversible cycle for both heating and cooling. For cooling purposes, the heat from the air is exchanged by the heat pump apparatus and a cooling of the air results. For heating purposes, heat is extracted from the air (outside air) and the heat from the outside air is used to raise the temperature of inside air. When the supply (outside) air is relatively cool, the heat is supplemented by utilizing an additional source, such as an electric resistance heater.

In the cooling mode, the heat pump is similar to a refrigeration system, and it has substantially the same components. However, a refrigerator or refrigeration system extracts heat from a chamber by the evaporation of a refrigerant, and thereby reduces the temperature of the air in the chamber, while the heat pump utilizes the condensation of a heat transfer medium. The primary difference between heating and cooling in the heat pump is in the coils referred to as the condenser and the evaporator. In the heating mode, heat is added to the air by being blown over condenser coils and circulated through the structure. The air which passes over the evaporator is accordingly outside air, which gives off heat through the evaporator.

In the cooling cycle, inside air is circulated through the evaporator, where the heat is given off and thus cooled air is recirculated through the structure. The outside air is circulated through the condenser to cool the condenser. A four-way valve is used to switch between the heating and cooling cycles.

In recent years the efficiency of refrigeration systems for homes, and the like, has been increased by cooling the condenser coils in a more efficient manner. For accomplishing this, units referred to simply as pre-coolers have been used. These pre-coolers simply provide a spray of water directly onto the condenser coils. The heat given off by the condenser coils is accordingly transferred to the water and the air. Such apparatus are shown in U.S. Pat. Nos. 3,427,005 and 3,108,451.

For improving the efficiency of the use of energy, particularly for the southwestern portion of the United States, the combining of heat pumps with evaporative cooling systems has been suggested. Such apparatus is shown in U.S. Pat. No. 3,859,818. In the '818 patent, a refrigeration air conditioner and an evaporative cooler air conditioner use the same ducts to supply conditioned air throughout a building, such as a home. Both the supply duct and the return air duct for the refrigeration (heat pump) system are used as a single supply duct for the evaporative cooler.

U.S. Pat. No. 3,182,718 discloses a combination of an evaporative cooling system, a heater, a refrigeration system, all of which operate using a single blower for moving air. A plurality of dampers or louvers is connected to a duct system to allow a single blower to be used for all three devices.

U.S. Pat. No. 4,066,118 discloses a combination of a heat pump with facilities for thermostorage, an evaporative cooler, and a solar heat collector. The heat pump uses two heat exchangers, an indoor heat exchanger and an outdoor heat exchanger, and a third heat exchanger in series with the outdoor heat exchanger, with the third heat exchanger used to provide heating or cooling, as required by the heat pump, during critical ambient conditions. The third heat exchanger is used to improve the relative efficiency of the heat pump under certain critical conditions.

SUMMARY OF THE INVENTION

The invention described and claimed herein comprises a heating and cooling system having an evaporative cooler and a heat pump connected together to supply cooling air to the structure in which the apparatus is located and the evaporative cooler is also used to cool the condenser coils of the heat pump during the cooling mode of the heat pump. Internal air from within the structure or from a secondary heat source, such as solar heat, is used with the heat pump when the heat pump is in the heating mode.

Among the objects of the present invention are the following:

To provide new and useful cooling apparatus;

To provide new and useful heating apparatus;

To provide new and useful heating and cooling apparatus;

To provide new and useful cooling apparatus using an evaporative cooler with a heat pump;

To provide new and useful apparatus for providing a source of secondary heat for a heat pump when the heat pump is in a heating mode;

To provide new and useful duct apparatus for intermixing air flows in a heating and cooling system;

To provide new and useful apparatus for exhausting air out of an attic;

To provide new and useful apparatus for pre-cooling air flowing over the condenser section of a heat pump; and To provide new and useful apparatus for interfacing a heat pump and an evaporative air cooler system.

DESCRIPTION OF THE PREFERRED EMBODIMENT

Figure 1:
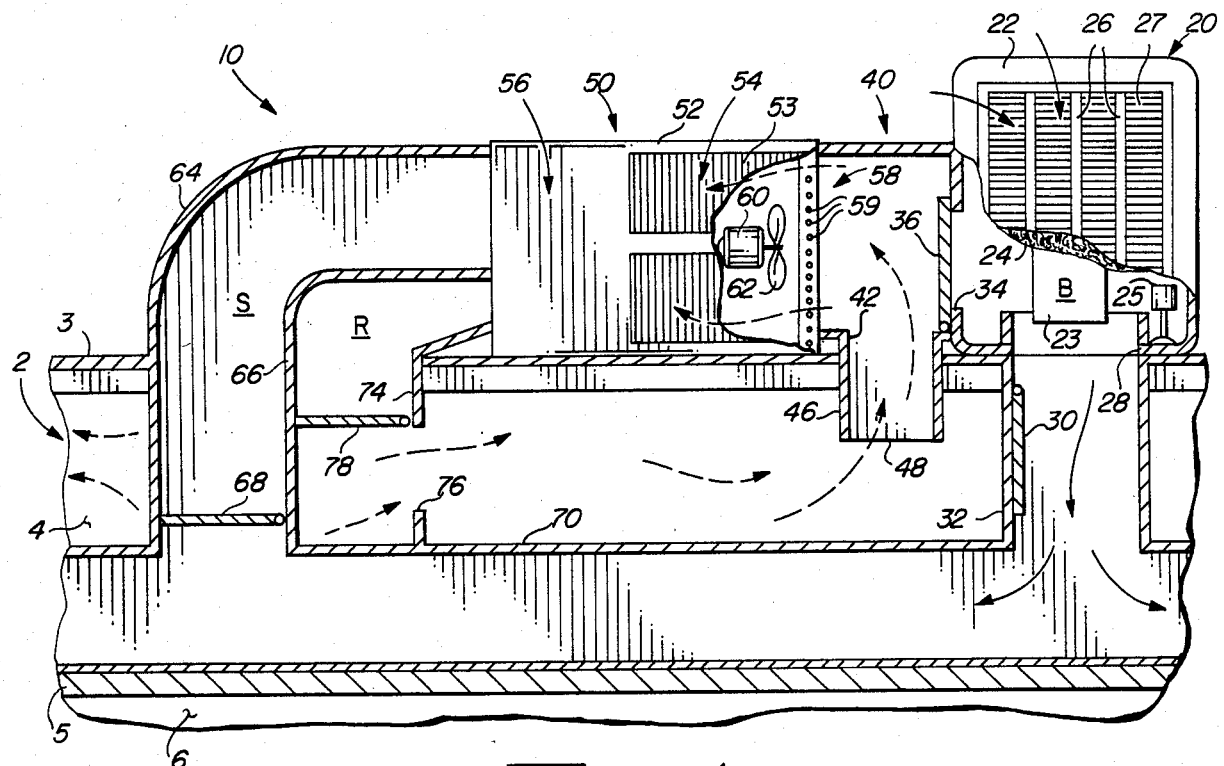
FIG. 1 is a view in partial section of apparatus of the present invention showing the apparatus secured to a structure illustrating one mode of operation, namely an evaporative cooling mode with attic exhausts through a heat pump condenser section.

FIG. 1 comprises a view in partial section of heating and cooling apparatus 10 which includes an evaporative cooler 20 connected to a heat pump 50 through an interface 40. The evaporative cooler, the interface, and the heat pump are all secured to a structure 2, which may be a home, a building, or the like. The structure 2 includes a roof 3, a ceiling 5, and an attic 4 between the roof and the ceiling, and a room 6 beneath the ceiling. The evaporative cooler 20, the interface 40, and the heat pump 50 are all disposed on and secured to the roof 3 of the apparatus.

The evaporative cooler 20 includes a housing 22, with a plurality of pads 24 secured to the housing 22 by a frame 26. As is well known and understood, the frame 26 includes a plurality of louvers 27 through which air flows into the cooler 20. The pads are water soaked from the gravity flow of water pumped to a trough or manifold within the housing 22 above the pads. The trough or spider manifold includes holes through which the water flows downwardly through the pads and to the bottom of the housing 22. A recirculating pump 25 is used to pump the water upwardly to the trough or manifold. A water source and valve (not shown) are connected to the housing. Appropriate electrical power (not shown) is also connected to the cooler apparatus 20.

A blower 23 is disposed within the evaporative cooler housing 22, as is well known and understood.

At the bottom of the housing 22 is an opening 28 which connects the evaporative cooler 20 to a supply duct 32. The duct 32 is in turn connected to a distribution duct 70 which carries the air from the evaporative cooler 20, and also from the heat pump 50, to appropriate registers throughout the various rooms of the structure 2.

The opening 28 is controlled by a baffle or damper 30 which is movable within the duct 32 to control the flow of air through the duct and through the opening 28.

Instead of pivoting baffles or dampers, such as shown herein, it will be understood that movable louvers, or the like, may be used.

The interface unit 40 comprises ductwork which extends between the evaporative cooler 20 and the heat pump 50. The interface 40 extends from one side of the evaporative cooler housing 22 to the normally open end portion of the heat pump 50.

There is an opening 34 in the side wall of the evaporative cooler housing 22 which allows communication between the evaporative cooler 20 and the interface 40. The opening 34 is controlled by a movable baffle or damper 36.

At the bottom of the interface unit 40 there is an opening 42 which is connected to a duct 46. The duct 46 extends into the attic 4 and includes an open bottom end 48. The opening 42 is controlled also by the baffle or damper 36. Thus the flow of air into and out of the duct 46 and the opening 42 varies in accordance with the position of the baffle 36.

The baffles 30 and 36 may be of any appropriate design. As illustrated herein, the baffles are pivotally secured in place and accordingly move through a 90° arc between their full open and full closed positions. Electric motors and appropriate controls may be used to actuate the baffles or dampers.

The heat pump 50 includes a housing 52 which may be divided, generally, into three portions. In the center of the heat pump 50 is a compressor portion 54, and at one end is an evaporator portion 56, and at the opposite end is a condenser portion 58. As is known and understood, the terms "evaporator" and "condenser" are broadly interchangeable, depending on whether the heat pump apparatus 50 is in the heating or cooling mode. For purposes of the present invention, except as otherwise specifically stated, the heat pump 50 will be considered to be in the cooling mode, with the condenser portion 58, including a plurality of condenser coils 59 adjacent to the interface 40. At the opposite end of the heat pump 50 is the evaporator portion 56, which is connected to a manifold 64 which in turn extends to a duct 66. The duct 66 connects to the supply duct 70 which distributes air from the heating and cooling apparatus 10 throughout the rooms of the structure 2. A pivoting baffle or damper 68 controls the flow of air between the ducts 66 and 70. The damper 68 may not be needed.

A portion of the housing 52 of the heat pump 50 has been broken away to show a fan motor 60, with fan blade 62 connected thereto, adjacent the coils 59 of the condenser 58. Air is normally drawn into the housing 52 of the heat pump 50 by the turning of the fan blade 62. The air is drawn through the coils 59 of the condenser 58. As is known and understood, the coils 59 are connected by a plurality of thin fins. The purpose of the fins and the moving air is, of course, for heat transfer purposes. The air drawn through the condenser 58 is then exhausted outwardly through a plurality of fixed louvers 53. The louvers 53 typically are found on both sides of the housing 52, rearwardly of the condenser 58, and they extend from the condenser area, generally along the compressor portion 54 of the heat pump 50, and terminate prior to the evaporator portion 56. The air, as it moves through the finned coils 59 of the condenser 58, removes heat from the condenser and the heated air is then exhausted from the housing 52 to the outside air from whence it came. In the apparatus of the present invention, the air which moves through the condenser 58, as pulled by the fan 62, moves through the interface 40 since the condenser 58 is not exposed directly to the outside or ambient air.

Return air for the heat pump 50 is by way of return air duct 74, schematically illustrated in FIG. 1 as being adjacent the supply duct 66. The return air duct 74 is connected to appropriate ductwork in each of the various rooms of the structure or building 2. The return air duct 74 includes an opening 76 which communicates directly with the return air duct 74 to the attic 4. A pivoting louver or damper 78 controls the flow of air through the opening 76, and also through the return air duct 74, downstream, of the opening 76, and prior to the evaporator portion 56 of the heat pump 50. When the baffle or damper 78 is in the position shown in FIG. 2, the flow of air through the return air duct 74 is to the heat pump 50 and through the evaporator coils within the evaporator portion 56, and then returned through the manifold 64 and the duct 66 to the distribution manifold 70.

The apparatus 10, in the configuration shown in FIG. 1, comprises the use of the evaporative air cooler apparatus 20 as the primary cooling system for the home or structure 2. Outside or ambient air, illustrated in FIG. 1 by the continuous arrows, flows into the evaporative air cooler 20 through the louvers 27, and through water soaked pads 24. The blower 23 is operative to pull the outside ambient air into the air cooler and through the pads, where the air loses heat and increases in humidity by the evaporation of the water on the pads 24. The cooled air is in turn blown into the duct 32, through the opening 28, which is uncovered by the baffle or damper 30. From the duct 32, the air flows through the distribution duct 70 to the various rooms, such as the room 6, beneath the ceiling 5.

The return air from the rooms in the building 2 flows upwardly through the return air duct 74 and through the opening 76 into the attic 4. The damper or baffle 78 is shown closing the return air duct 74 above or downstream from the opening 76. The cool air from the rooms, such as room 6, flows through the attic 4, and through the open duct 46 into the interface 40. The baffle or damper 36 is shown closing the opening 34, and thus allowing the air from the duct 46 to flow through the opening 42 into the interior of the interface 40.

Part of the return air flows through the interface 40, and part of the return air flows out any attic vents, such as gable ends, soffit vents, etc. The air flowing into the condenser portion 58 is exhausted or returned to the ambient air through the louvers 53.

At any time the temperature in the attic is 120° F. or above, the fan motor 60 is on, providing the cooler or blower motor 23 is off, thus providing the negative pressure to pull the return air from the duct 74, through the opening 76, and through the attic 4 into the duct 46, the interface 40, and into and out of the condenser portion and louvers of the heat pump 50. The flow of the return air, which is substantially cooler than the attic air, thus serves to reduce the temperature of the air in the attic and in turn increases the efficiency or effectiveness of the cooling of the house or structure 2.

Figure 2:
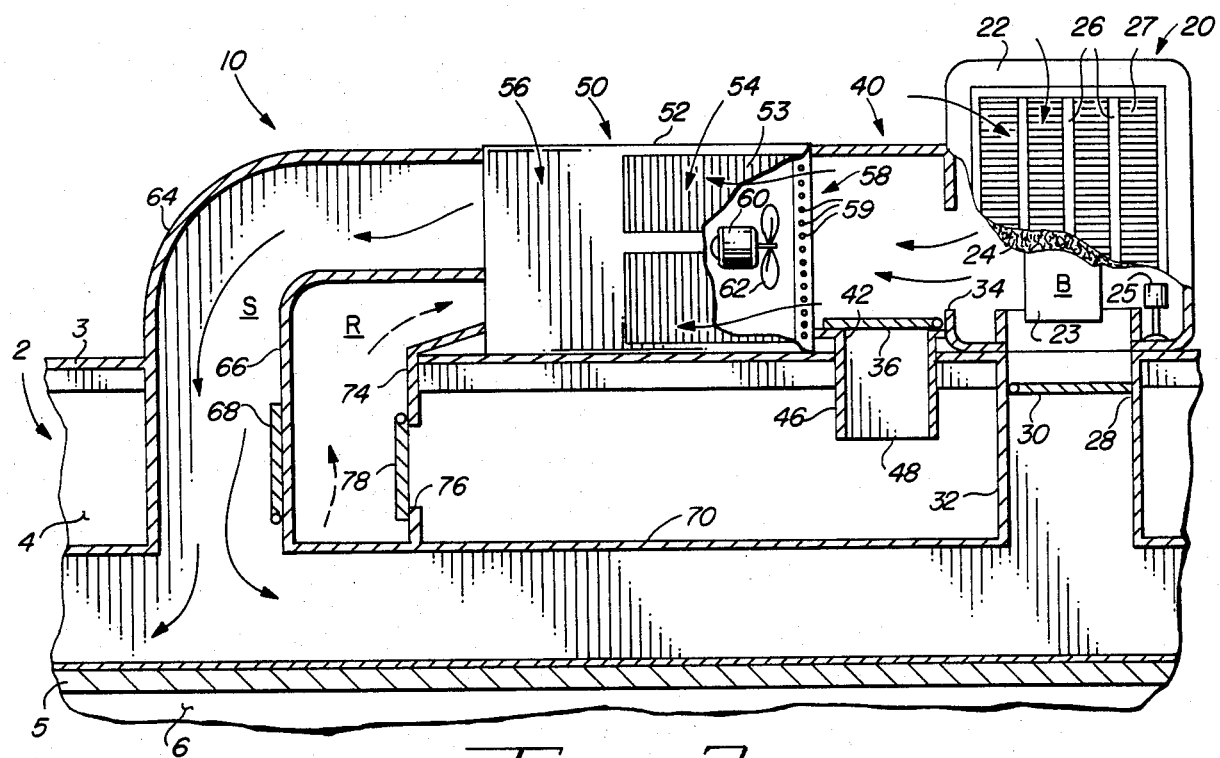
FIG. 2 is a view in partial section of the apparatus of FIG. 1 illustrating a second mode of operation, namely a precooling mode.

FIG. 2 comprises a view in partial section of the apparatus of FIG. 1, illustrating a second mode of operation. In the mode of operation illustrated in FIG. 2, the heat pump 50 is operating in its cooling mode, and the evaporative air cooler 20 is operating as a precooler for the condenser 58 of the heat pump 50.

The evaporative cooler 20 operates in the same manner as described above, except that the baffle or damper 30 is in the position shown in FIG. 2, closing the opening 28. Accordingly, the air flowing into the evaporative air cooler 20, through the louvers and through the water-soaked pads, does not flow through the ductwork 32 and into the supply or distribution duct 70. Rather, the cooled air flows through the opening 34, and through the interface 40, and through the condenser coils 59, thus exchanging heat with the condenser coils 59. The blower 23 is off, the damper 36 is in the position shown in FIG. 2, uncovering the opening 34, and closing the opening 42. The fan motor 60 is accordingly on, with the fan blade 62 comprising the prime source of negative pressure which pulls the air into the evaporative cooler 20, through the soaked or saturated pads 24, and through the condenser 58. The air flowing through the condenser 58 is exhausted or returned to the outside ambient air through the fixed louvers 53.

The air flowing into the evaporative air cooler 20 is a separate air flow from that flowing through the evaporator coils (not shown) in the evaporator section 56 of the heat pump 50. The air flowing through the evaporator coils flows into the distribution duct 70 from the manifold 64 and the duct 66, since the baffle or damper 68 is in its "open" position, as shown in FIG. 2, uncovering the opening between the duct 66 and the duct 70.

The return air from the home or structure 2 flows through the return air duct 74 and to the return air portion of the evaporator section 56 of the heat pump 50. The damper or baffle 78 is shown closing the opening 76, thus preventing the return air from flowing into the attic 4. The return air continues to flow through the return air duct 74 to the evaporator coils within the heat pump 50, and is thus cooled again and returned to the rooms within the structure to the supply duct 66 and the distribution duct system 70.

It will be noted that there is no air flow from the attic 4 through the duct 46 and into the interface 40 in the heat pump cooling mode illustrated in FIG. 2. Air flow through the attic 4 is in its normal mode, without the benefit of the apparatus of the present invention. The cooler 20, with the interface 40, acts as a precooler for the condenser portion of the heat pump 50 in its cooling mode. The cooler pump 25 is on, saturating the cooler pads. However, the blower motor 23 is off, and the baffle 30 is closing the duct 32 so that no air flow to the cooler goes into the duct 32 and into the duct 70. Rather, the air flowing through the water soaked cooler pads flows through the opening 34 and into the interface 40, through the interface 40 and into the condenser portion 58, and out the louvers 53. The cool air flows over the condenser coil 59, thus cooling the coils, and increasing the efficiency of the heat pump.

When the thermostat in the house is satisfied, the compressor portion of the heat pump 50 turns off. The condenser motor 60 may continue to run, with the baffle 36 opened to allow attic air to be exhausted through the condenser portion of the heat pump 50.

Figure 3:
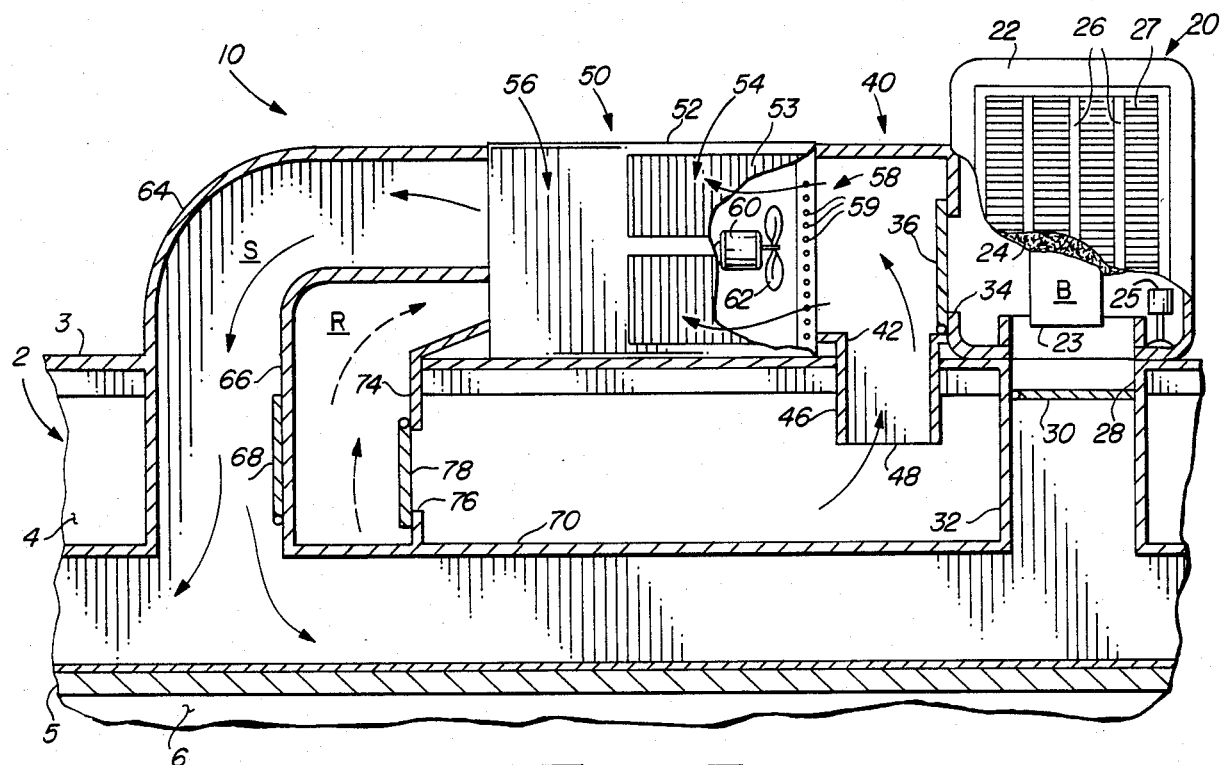
FIG. 3 is a view in partial section showing a third mode of operation of the apparatus of FIGS. 1 and 2, namely a heating mode for a heat pump.

FIG. 3 shows a view in partial section of the apparatus 10 operating in a third mode. The third operating mode comprises a heating mode for the heat pump 50, in which the coils 59 of the condenser 58 act as an evaporator, which causes the fluid flowing through the coils 59 to absorb heat to increase the efficiency of the heat pump 50 in the heating mode.

The evaporative cooler system 20 is inoperative, with the baffle 30 closing the opening 28, and the baffle 36 closing the opening 34. With the baffle 36 closing the opening 34, the opening 42 is uncovered, allowing air to flow from the attic 4 through the duct 46 and into the interface 40. The warm attic air is used as a preheater for the coils 59. The warm air from the section 56, which is now acting as a condenser section, absorbs heat as it passes over the coils within the section 56, and then flows through the manifold 64, the duct 66, and into the distribution ducts 70.

The return air flows through the return duct 74, past the opening 76, and back to the heating portion of the heat pump 50.

Figure 4:
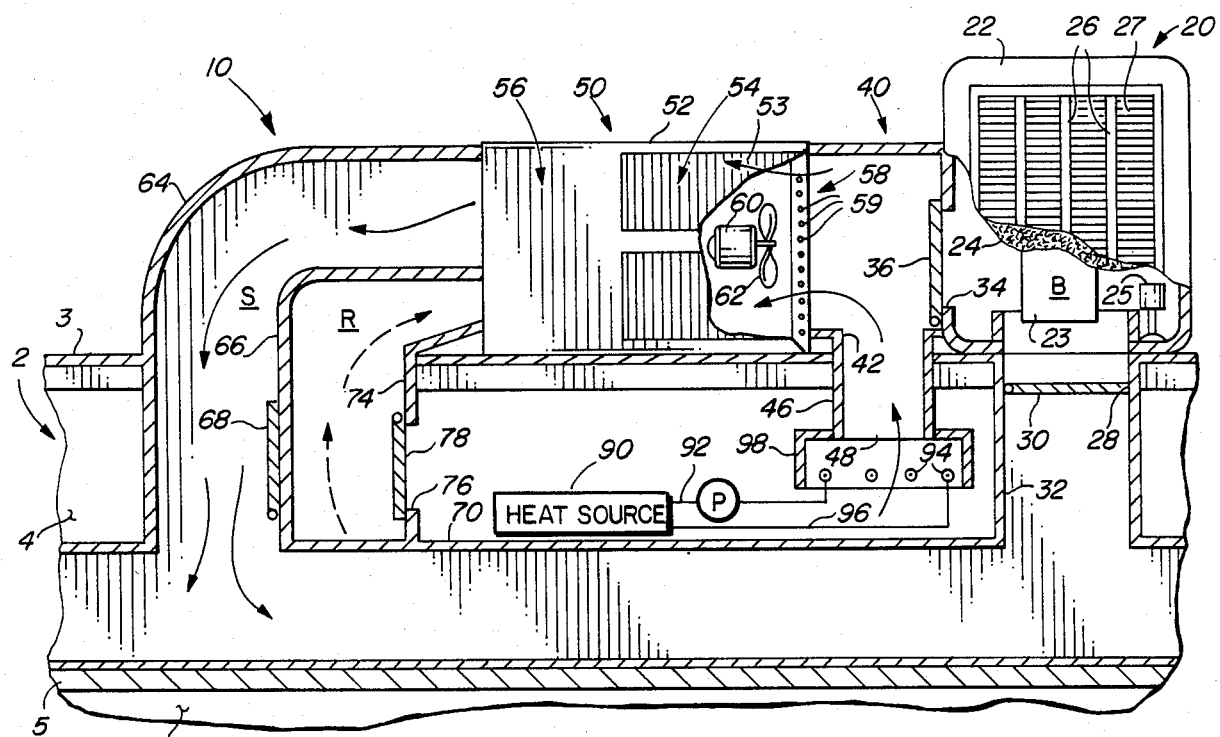
FIG. 4 is a view in partial section of the apparatus of FIGS. 1, 2, and 3, illustrating an alternate embodiment showing another heating mode.

An alternate embodiment of the apparatus 10 operating in the heating mode of FIG. 3 is illustrated in FIG. 4. FIG. 4 comprises a view in partial section of an alternate heating mode in which a heat source 90 is used to provide additional heat for heating the air flowing through the coils 59.

In the operative mode of FIG. 4, the evaporative cooler is off, as it is in FIG. 3. Thus, the blower 23 is off, the baffle or damper 30 is closing the opening 28, preventing air from flowing through the evaporative cooler 20 into the duct 32 and the duct 70, and vice versa. Similarly, the damper or baffle 36 is shown closing the opening 34, to prevent air from flowing between the evaporative cooler 20 and the interface 40.

Air from the attic 4 flows through the duct 46 and through the opening 42 into the interface 40. From the interface 40, the air flows through the coils 59 where heat is exchanged to preheat the coil 59.

However, the duct 46 includes a manifold 98 in which is disposed a plurality of coils 94 through which a heating medium, such as a liquid, is flowing. The source of the heat medium flowing through the coils 94 is from a heat source 90, through a supply line 92, to the coils 94, and back to the heat source 90 through return line 96.

The heat source 90 may be a solar panel array, or a heat sink used in conjunction with a solar panel array, or the like. A pump in the supply line 92 provides positive pressure for the flow of the heating medium or liquid through the coils 94 within the manifold 98. The attic air thus gains additional heat as it flows to the coils 94 to increase the efficiency of the air preheater for the evaporator coils 59.

Figure 5:
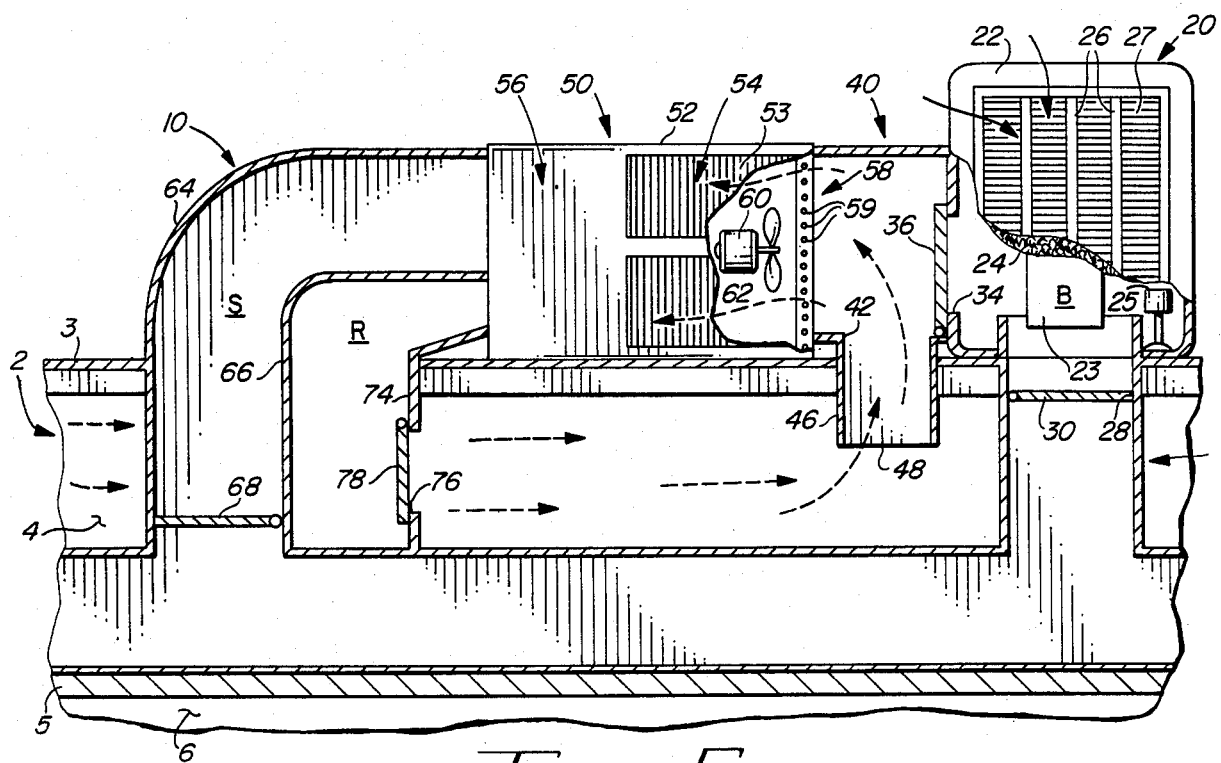
FIG. 5 is a view in partial section of the apparatus of FIGS. 2 and 3 showing the use of a condenser fan for attic exhaust.

FIG. 5 comprises a view in partial section of the apparatus of FIGS. 1-3 used in a different or alternate mode in which the condenser motor 60 and its fan blades 62, which both comprise the condenser fan, are used as an exhaust fan for exhausting hot attic air. The use of the heat pump apparatus 50, as shown in FIG. 5, will typically be used during hot days, when the heat pump is used in its cooling or refrigeration mode.

The heat pump 50 is turned off, and accordingly no air is flowing through the evaporator portion 56. No air is accordingly flowing through the supply duct 66 from the evaporator 56 into the distribution duct 70, and no air is flowing through the return duct 74. The baffle 78 in the return duct 74 is shown closing the opening 76 to prevent air flow between the return duct 74 and the attic 4.

The evaporative cooler 20 is also in its off mode, with the blower 23 off, and the baffle 30 closing the bottom opening 28 of the evaporative cooler 20.

The baffle 36 is closing the side opening 34 between the evaporative cooler 20 and the interface unit 40. With the baffle 36 closing the opening 34, the bottom opening 42 between the interface 40 and the duct 46 is open, allowing air to flow from the attic through the duct 46 and into the interface unit. The hot air is drawn by the motor 60 and its fan blade 62. Thus, the condenser fan is used as an exhaust fan for moving heated air from the attic 4 out of the attic through the condenser portion of the heat pump 50.

The condenser motor 60, in order to function as an attic exhaust fan, must be connected separately from the heat pump 50 to a thermostat (not shown) in the attic. In the embodiment of FIG. 5, the condenser fan becomes a power exhaust fan to pull hot attic air out of the attic only after the heat load in the building or house has been satisfied. At such time as the temperature in the room 6 is low enough, the cooling system is turned off, but the condenser motor 60 continues to operate under the control of the thermostat in the attic 4 until the temperature in the attic drops to a preset temperature.

For hot summer mornings, the condenser motor 60 may also come on under the control of the attic thermostat. When the attic temperature reaches a predetermined point, even though the temperature in the building or house room 6 remains below the point at which the thermostat calls for cooling in the building room, the motor 60 turns on to exhaust hot air out of the attic at such time as the room thermostat calls for cooling, the heat pump takes over in its cooling mode, as discussed above. When that happens, the condenser motor 60 and its fan 62 become part of the heat pump again, and cease to function as an exhaust fan. The baffle 36 closes the opening 42 of the duct 46 and uncovers the opening 34 to allow the apparatus to operate as described above in conjunction with FIG. 2. The attic thermostat is rendered inoperative until such time as the room thermostat is satisfied.

Figure 6:
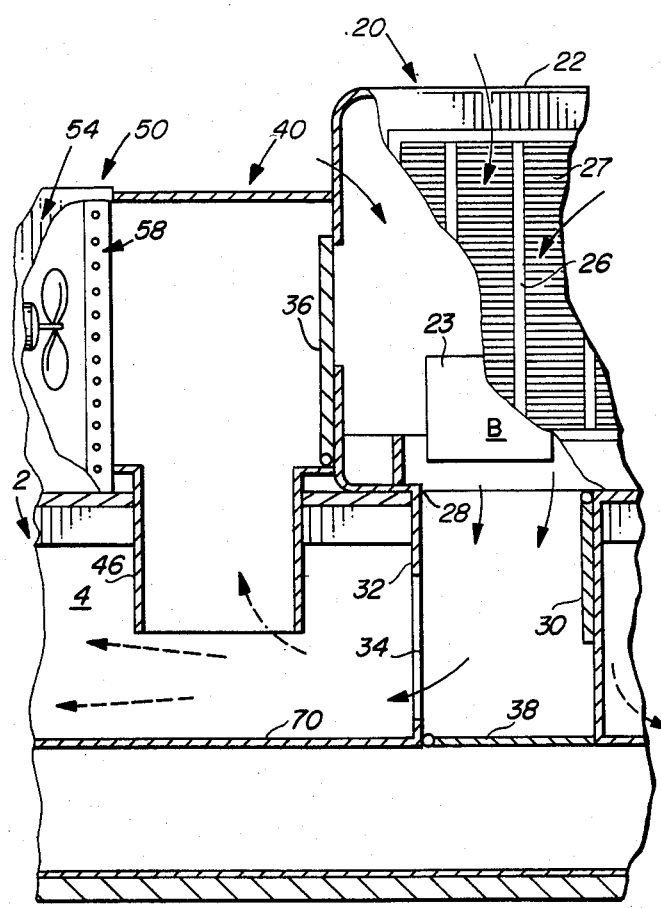
FIG. 6 is a view in partial section of the apparatus of FIG. 1 illustrating an alternate mode of operation namely an evaporative cooling mode for an attic.

FIG. 6 comprises a view in partial section of another mode for exhausting or cooling the attic 4. In FIG. 6, the blower 23 of the evaporative cooler 20 is used as a blower to push air through the attic 4 from the duct 32 through a side opening 34 in the duct 32 from the evaporative cooler 20. The baffle 30 which closes the opening 28 between the evaporative cooler 20 and the duct 32 is in its open position, thus allowing air to flow from outside, through the cooler louvers 27, and through the opening 28 into the duct 32. A baffle 38 closes the air flow from the duct 32 into the supply duct 70, and opens the opening 34 in the duct 32. The outside air, cooler than the attic air 4, thus flows through the attic 4 and out of the attic, as through louvered ends, or through the duct 46 and the interface 40, through the condenser portion 54 of the heat pump 50 to outside air. The air in the attic 4 will be replaced by evaporatively cooled air from outside the structure through the evaporative cooler 20, regardless of the path the air takes from the evaporative cooler 20, the duct 32 and out of the attic 4. It will be noted that the blower motor 23, and thus the cooler 20, will be "on" only when the condensing motor 60 is "off", indicating that the thermostat in the house has been satisfied for cooling purposes.

Figure 7:
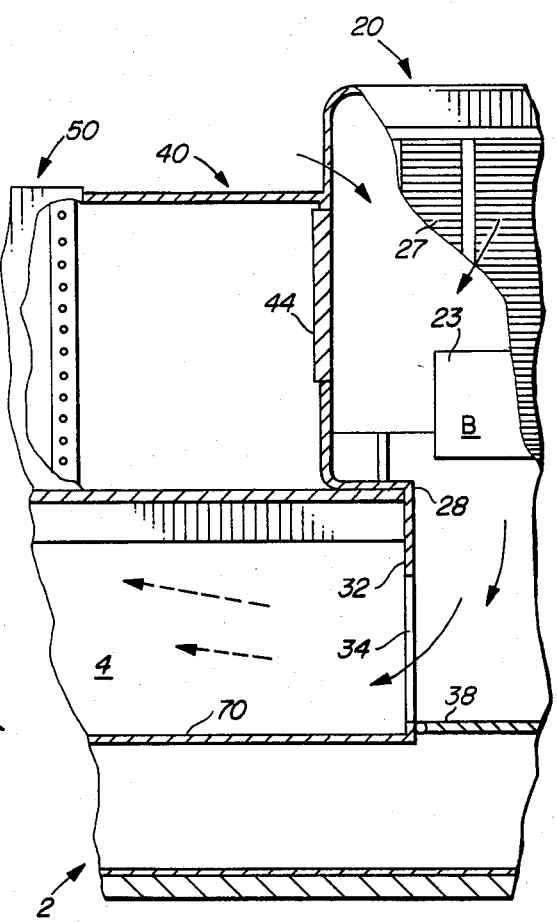
FIG. 7 is a partial section view of an alternate embodiment of the apparatus of present invention, namely another evaporative cooling mode for an attic.

FIG. 7 is an alternate embodiment of the apparatus of the present invention, in which the evaporative cooler 20 may be used with a heat pump 50 without the interface 40. The evaporative cooler 20 and the heat pump 50 may be used separately, without the various features discussed above in conjunction with the embodiments of FIGS. 1–6. Both the heat pump 50 and the evaporative cooler 20 are connected to the supply distribution duct 70 for supplying conditioned air to the rooms, such as the rooms within the structure 2.

The heat pump 50 supplies both cooled and warmed air, as discussed above, to the duct 70. The temperature of the air supplied is determined by the users of the building or structure 2.

The evaporative cooler 20, when the heat pump 50 is not operating, may be used to supply air for the structure 2 to the supply duct 70. The evaporative cooler 20 may also be operated in a second mode. With the baffle 38 closing the opening between the duct 32 and the duct 70, the opening 34 in the duct 32 is uncovered or opened. The air flowing through the louvers 27 of the evaporative cooler 20, pulled in by the blower 23, flows through the duct 32 and the opening 34 into the attic 4 for circulating outside air through the attic to displace the hot air in the attic, as discussed above.

In one mode shown in FIG. 7, the opening 28 between the evaporative cooler 20 and the duct 32 is open, thus allowing for the unrestricted flow of air from the cooler 20 into the duct 32 and through the opening 34 into the attic 4. The attic air is pushed out, rather than pulled out, as discussed above using the condenser motor and fan as an exhaust fan.

For selection of the mode of operation of the evaporative cooler 20 as shown in FIG. 7, the system may be run automatically, as by a thermostat (not shown) disposed in the attic 4, or it may be manually selected by a user from a site remote from the attic 4 and the evaporative cooler 20, within the structure 2. The operation of the baffle 38 may be under the same selective control mode, as desired.

The interface 40 is shown in FIG. 7, but the duct 46 is not shown, and thus there is no communication between the interface 40 and the attic 4. As indicated above, the interface 40 may be omitted completely to eliminate the precooling function of the evaporative cooler 20. The evaporative cooler, under such circumstances, may be used in either one of two modes, either to provide cooling to the supply duct 70, or to provide for the exhausting of normal attic air by the cooled air provided by the evaporative cooler.

With the interface 40 disposed between the evaporative cooler 20 and the heat pump 50, the normal precooling mode, as discussed above in conjunction with FIG. 2, may be accomplished by the evaporative cooler 20. Since there is no communication between the interface 40 and the attic 4, the wall between the evaporative cooler 20 and the interface 40 need only include a movable louver type baffle rather than a plate, such as the baffle plate 38 in FIG. 7. A louver type baffle 44 is disposed in the cooler wall between the cooler 20 and the interface 40. The louvers operate by an appropriate motor, or the like, not shown, when the cooler 20 is used as a precooler for the heat pump 50. When the evaporative cooler 20 is used either to provide cooling air to the duct 70, or to provide cooling air for exhausting the attic, the louver damper 44 is in its closed position, preventing air flow between the evaporative cooler 20 and the interface 40.

It will be noted that in the embodiment of FIGS. 6 and 7, a baffle 38 is used to control the flow of air between the duct 32 and the duct 70, and through the opening 34 into the attic 4. In FIG. 6, the baffle 30 for controlling the opening 28 between the cooler 20 and the duct 32 is also shown. However, in the embodiment of FIGS. 1 through 5, the duct 32 is solid, without the opening 34. In those embodiments, the communication between the cooler 20 and the attic 4 is through the opening 76 in the return air duct 74, with the damper 78 controlling the flow of air from the duct 74 through the opening 76. If desired, the opening 34 and the damper 38 may also be included in the embodiments of FIGS. 1-5 to allow the selective flow of cooling air into the attic 4. Utilizing the opening 34 and the baffle 38, the flow of evaporatively cooled air flows directly into the attic 4. Utilizing the opening 76 and the baffle 78 in the return air duct 74, the evaporatively cooled air flows into the attic 4 after its distribution through the structure in which the apparatus is disposed by way of the return duct system in the structure.

For the apparatus of the present invention, as discussed in the several embodiments discussed above, it is obvious that various types of switches, thermostats, solenoids, etc., may be necessary for the appropriate control of the various elements, and for safety purposes. In addition to the various switches and thermostats mentioned, but not shown, a safety solenoid may also be used to shut off water for the evaporative cooler when the evaporative cooler is not to be used as a source of water-cooled air either for the structure 2 or for the heat pump 50. Moreover, a safety switch may be needed to insure that the blower motor 23 is off when the condenser motor 62 is on. Furthermore, an override switch may be necessary for insuring that the blower motor 23 is off when the compressor motor for the heat pump is on. This further insures that a thermostat (not shown) within the rooms of the house, such as the room 6, is satisfied for cooling purposes in order to have the blower motor 23 on for exhausting the attic, as shown in FIG. 7. While the heat pump compressor is on, the blower motor 23 should be off, and the cooler 20 will then operate in its precooling mode. In such precooling mode, as discussed above, water is circulated by the evaporative cooler pump 25 to keep the cooler pads soaked with water. Only when the thermostat in the house is satisfied should the thermostat (not shown) in the attic be used to control the blower motor 23 for attic exhaust purposes.

When the apparatus of the present invention is operated in the preheating mode, any auxiliary source of heat may be used, such as stored heat from a rock bin or the like, heated fluid as from solar energy, etc. Such auxiliary source of heat is designed to increase the efficiency of the apparatus and to reduce the need for electrical energy. In the precooling mode, there is also a reduction in the need for electrical energy by precooling the condenser unit of the heat pump and by cooling the air in the attic to reduce the demand for cooling in the room(s) within the structure and below the attic.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted for specific environments and operative requirements without departing from those principles. The appended claims are intended to cover and embrace any and all such modifications, within the limits only of the true spirit and scope of the invention. This specification and the appended claims have been prepared in accordance with the applicable patent laws and the rules promulgated under the authority thereof.

What is claimed is:

1. In a building having at least a single room to be selectively cooled and/or heated, an attic above the room, and a roof covering the attic, heat pump and evaporative cooler apparatus, comprising, in combination:
heat pump apparatus, including
an evaporator portion having means for selectively providing a first flow of cooled air when operating in a cooling mode, and
a condenser portion having a plurality of condenser coils and a condenser fan for providing a flow of air over the condenser coils;
first duct means for distributing air to the room in the building;
second duct means for connecting the evaporator portion to the first duct means to provide a flow of cooled or heated air to the first duct means;
evaporative cooler means adjacent to the condenser portion for providing a second flow of cooled air;
third duct means extending from the evaporate cooler means to the first duct means for connecting the evaporative cooler means to the first duct means;
first baffle means in the third duct means having a closed position for disconnecting the evaporative cooler means from the first duct means when the heat pump means is operating in the cooling mode or the heating mode, and having an open position for connecting the evaporative cooler means with the first duct means;
interface means extending between and directly connecting the evaporative cooler means and the condenser means for pre-cooling the condenser coils from the second flow of cooled air of the evaporative cooler means when the heat pump means is operating in the cooling mode, including
second baffle means having an open position and a closed position for selectively opening and closing the second flow of air from the evaporative cooler means to the interface means; and
third baffle means in the second duct means for preventing a flow of cooled air to the evaporator portion when the evaporative cooler means is connected to the first duct means.

2. The apparatus of claim 1 in which the first baffle means is closed when the heat pump means is operating in its cooling mode or in its heating mode.

3. The apparatus of claim 2 in which the second baffle means is open to provide the second flow of cooled air to the condenser portion when the heat pump means is operating in the cooling mode.

4. The apparatus of claim 3 in which the second baffle means is closed when the heat pump means is operating in its heating mode and when the first baffle means is open to provide the second flow of cooled air to the third duct means and to the first duct means.

5. The apparatus of claim 1 in which the third duct means further includes opening means for connecting the third duct means to the attic for cooling the attic with the second flow of cooled air.

6. The apparatus of claim 5 in which the first baffle means further includes means for selectively opening and closing the opening means in the third duct means for controlling the second flow of cooled air from the third duct means to the attic or to the first duct means.

7. The apparatus of claim 1 which further includes fourth duct means connecting the room with the evaporator portion to provide a return flow of air from the room to the evaporator portion of the heat pump.

8. The apparatus of claim 7 in which the fourth duct means includes an opening communicating with the attic for cooling the attic with the return flow of air.

9. The apparatus of claim 8 in which the fourth duct means further includes third baffle means for selectively controlling the return flow of air to the evaporative portion of the heat pump apparatus or through the opening in the fourth duct means to the attic.

10. The apparatus of claim 1 in which the interface means further includes fifth duct means for connecting the attic to the interface means to provide a flow of air from the attic to the condenser portion of the heat pump means for preheating the condenser coils when the heat pump means is operating in the heating mode.

11. The apparatus of claim 10 in which the fifth duct means includes auxiliary heat means for warming the flow of air from the attic through the fifth duct means for preheating the condenser coils.

12. The apparatus of claim 11 in which the interface means further includes means for controlling the flow of air from the attic through the fifth duct means.

13. Heat pump and evaporative cooling apparatus, comprising, in combination:
heat pump means having a cooling mode for providing a first flow of air in which cooling is accomplished by an evaporator which receives liquid refrigerant at high pressure condenser coils;
a second flow of air flowing over the condenser coils for removing heat from the condenser coils;
cooler means disposed adjacent to the heat pump means for providing a flow of water cooled air;
duct means connected to the heat pump evaporator and to the cooler means for receiving the first flow of air from the heat pump means and the flow of water cooled air from the cooler means; and
damper means for disconnecting the flow of water cooled air from the cooler means to the duct means, for connecting the flow of water cooled air to the heat pump means for cooling the second flow of air through the condenser coils for lowering the temperature of the condenser coils, including interface adapter means disposed between and connecting the cooler means and the heat pump means through which the water cooled air flows directly to the condenser coils from the cooler means, and for preventing the flow of water cooled air from the duct means to the heat pump evaporator means.

14. The apparatus of claim 13 in which the damper means further includes a first damper for disconnecting the cooler means from the duct means, and a second damper in the interface adapter means for connecting the cooler means to the heat pump means.

15. The apparatus of claim 14 in which the second damper means includes a first operable position for connecting the cooler means to the heat pump means, and a second operable position for disconnecting the cooler means from the heat pump means.

16. The apparatus of claim 15 in which the heat pump means includes a heating mode, and the interface adapter means includes auxiliary heat source means for warming air flowing through the interface adapter means.

17. The apparatus of claim 16 in which the second operable position of the second damper means further includes means for connecting the auxiliary heat source means of the interface adapter to the heat pump means.

* * * * *